US012748282B2

(12) United States Patent
Lin et al.

(10) Patent No.: US 12,748,282 B2
(45) Date of Patent: Sep. 29, 2026

(54) INFORMATION HANDLING SYSTEM CAMERA LENS WITH EIGHT ELEMENTS FOR IMPROVED APERTURE AND REDUCED BLUR

(71) Applicant: Dell Products L.P., Round Rock, TX (US)

(72) Inventors: YI-Hsien Lin, Taipei City (TW); Chih-Hao Kao, Singapore (SG); Tuck Leong Lim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 18/583,469

(22) Filed: Feb. 21, 2024

(65) Prior Publication Data

US 2025/0264692 A1 Aug. 21, 2025

(51) Int. Cl.
*G02B 9/64* (2006.01)
*G02B 13/00* (2006.01)
*G06F 1/16* (2006.01)

(52) U.S. Cl.
CPC ........... *G02B 9/64* (2013.01); *G02B 13/0045* (2013.01); *G06F 1/1686* (2013.01)

(58) Field of Classification Search
CPC ...... G02B 9/64; G02B 13/0045; G06F 1/1686
USPC .................................................. 359/714, 713
See application file for complete search history.

(56) References Cited

U.S. PATENT DOCUMENTS

| | | | | |
|---|---|---|---|---|
| 10,012,815 B2 | 7/2018 | Ichimura | | |
| 2017/0299845 A1 | 10/2017 | Yao et al. | | |
| 2018/0372998 A1* | 12/2018 | Pao | G02B 13/0045 | |
| 2021/0055528 A1* | 2/2021 | Wei | G02B 7/021 | |
| 2022/0128804 A1* | 4/2022 | Hua | G02B 27/0025 | |
| 2022/0137351 A1* | 5/2022 | Chen | G02B 9/64 | 359/708 |
| 2022/0244510 A1* | 8/2022 | Liu | G02B 15/144113 | |
| 2024/0192467 A1* | 6/2024 | Zhang | G02B 9/64 | |
| 2026/0003161 A1* | 1/2026 | Lin | G02B 13/0045 | |

* cited by examiner

*Primary Examiner* — William R Alexander
(74) *Attorney, Agent, or Firm* — Zagorin Cave LLP; Robert W. Holland

(57) ABSTRACT

An information handling system camera provides a ninety degree field of view with low distortion in low light environments by a capturing visual images through a lens having eight lens elements. The first lens element closest to the object and eighth lens element closest to the image each have a glass material, positive refractive power and spherical surface. The middle six lens elements each have a plastic material and aspherical surfaces that direct light to an image sensor through a variety of positive and negative refractive powers.

19 Claims, 9 Drawing Sheets

| SURFACE | RADIUS | THICKNESS/ SEPARATION | MATERIAL | REFRACTIVE INDEX(N) | ABBE NUMBER(V) | FOCAL LENGTH | LENS ELEMENT |
|---|---|---|---|---|---|---|---|
| 0 | INFINITY | INFINITY | | | | 4.500 | |
| 1 | INFINITY | 0.040 | | | | | |
| 2 | 8.295 | 2.267 | GLASS | 1.81 | 25.47 | 390.319 | L1 |
| 3 | 7.476 | 0.118 | | | | | |
| 4 | 4.216 | 1.214 | PLASTIC | 1.54 | 55.71 | -7.850 | L2 |
| 5 | 1.896 | 3.152 | | | | | |
| 6 | -12.735 | 2.812 | PLASTIC | 1.68 | 19.28 | -132.883 | L3 |
| 7 | -16.156 | 0.158 | | | | | |
| 8 | -35.222 | 1.685 | PLASTIC | 1.54 | 55.71 | 11.623 | L4 |
| 9 | -5.393 | 0.094 | | | | | |
| 10 | INFINITY | 1.145 | | | | | |
| 11 | 15.690 | 2.540 | PLASTIC | 1.68 | 19.28 | 82.678 | L5 |
| 12 | 20.368 | 0.385 | | | | | |
| 13 | -5.135 | 1.648 | PLASTIC | 1.55 | 56.00 | 7.482 | L6 |
| 14 | -2.534 | 0.099 | | | | | |
| 15 | 6.252 | 0.894 | PLASTIC | 1.67 | 20.38 | -8.484 | L7 |
| 16 | 2.801 | 0.490 | | | | | |
| 17 | 11.431 | 3.326 | GLASS | 1.59 | 68.34 | 7.742 | L8 |
| 18 | -6.867 | 3.686 | | | | | |
| 19 | INFINITY | 0.700 | H-K9L | 1.52 | 64.20 | INFINITY | FILTER |
| 20 | INFINITY | 0.144 | | | | | |
| 21 | INFINITY | 0.000 | | | | | |

FIG. 4

| NO. | K | A2 | A4 | A6 | A8 | A10 | A12 | A14 | A16 |
|---|---|---|---|---|---|---|---|---|---|
| 4 | -0.96 | 0.00 | -4.292E-03 | 2.195E-04 | -8.846E-06 | 2.616E-07 | -4.077E-09 | -8.346E-12 | 1.282E-12 |
| 5 | -0.86 | 0.00 | -4.101E-03 | -3.706E-04 | 3.114E-04 | -8.350E-05 | 1.170E-05 | -8.648E-07 | 2.551E-08 |
| 6 | -42.41 | 0.00 | -3.743E-03 | 6.555E-05 | -1.425E-05 | 4.403E-07 | 1.304E-07 | 2.057E-09 | -7.103E-10 |
| 7 | -203.99 | 0.00 | 1.983E-04 | -1.763E-03 | 1.020E-03 | -4.654E-04 | 1.256E-04 | -1.709E-05 | 9.257E-07 |
| 8 | 207.40 | 0.00 | 6.914E-03 | -4.954E-03 | 2.069E-03 | -8.157E-04 | 2.082E-04 | -2.829E-05 | 1.560E-06 |
| 9 | 3.31 | 0.00 | -1.459E-04 | -2.676E-04 | 3.005E-04 | -1.288E-04 | 3.633E-05 | -5.337E-06 | 3.371E-07 |
| 11 | 10.14 | 0.00 | -5.979E-03 | -2.953E-04 | 8.812E-05 | -6.318E-06 | 4.111E-08 | 0.000E+00 | 0.000E+00 |
| 12 | 41.61 | 0.00 | -7.950E-04 | -8.599E-04 | 1.977E-05 | 9.677E-06 | -8.125E-07 | 0.000E+00 | 0.000E+00 |
| 13 | 1.20 | 0.00 | 2.231E-02 | -3.197E-03 | 4.062E-04 | -4.961E-05 | 6.102E-06 | -4.883E-07 | 1.678E-08 |
| 14 | -5.81 | 0.00 | -8.519E-03 | 2.245E-03 | -4.412E-04 | 6.606E-05 | -7.068E-06 | 4.302E-07 | -1.039E-08 |
| 15 | 2.24 | 0.00 | -1.847E-02 | 1.749E-03 | -2.210E-04 | 2.691E-05 | -3.548E-06 | 2.953E-07 | -9.975E-09 |
| 16 | -8.68 | 0.00 | -3.023E-03 | 1.425E-04 | 7.316E-05 | -1.612E-05 | 1.598E-06 | -7.822E-08 | 1.525E-09 |

FIG. 5

| ITEM | | DESIGN DATA- |
|---|---|---|
| EFL(mm) | | 4.54 |
| F.no | | 1.8 |
| OPTICAL DISTORTION (%) | | <-3% |
| RELATIVE ILLUMINATION (%) | | 39% |
| FBL(INCLUDING FILTER + COVER GLASS)(mm) | | 4.23mm |
| TTL(INCLUDING FILTER + COVER GLASS)(mm) | | 26.65mm |
| CRA(deg.) | | 9.9 |
| FOV (deg) | HORIZONTAL | 80.6° |
| | VERTICAL | 50.1° |
| | DIAGONAL | 90° |

FIG. 9

INFORMATION HANDLING SYSTEM CAMERA LENS WITH EIGHT ELEMENTS FOR IMPROVED APERTURE AND REDUCED BLUR

BACKGROUND OF THE INVENTION

Field of the Invention

The present invention relates in general to the field of information handling system cameras, and more particularly to an information handling system camera lens with eight elements for improved aperture and reduced blur.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with processing components built into a housing and present the information as visual images at a display. Portable information handling systems integrate a display and a power source in a portable housing to support mobile operations. Desktop information handling systems typically rely on peripheral displays to present the information. Portable information handling systems will generally support presentation of visual images at both the integrated display and at peripheral displays. One type of portable information handling system has a convertible configuration that includes multiple separate housing portions that couple to each other so that the system converts between closed and open positions. For example, a main housing portion integrates processing components and a keyboard and rotationally couples with hinges to a lid housing portion that integrates a display. In a clamshell position, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Another type of portable information handling system has a tablet configuration with the display coupled over the processing components in a planar housing.

Information handling systems provide a convenient communication tool. Specifically, by including a camera with the information handling system an end user can readily participate in a videoconference communicated through the internet. The camera captures a field of view at the display so that an end user viewing the display to participate in the videoconference has an image of his face captured while viewing other participants to the videoconference at the display. One difficulty with this approach is that a limited space is typically available at the display where a camera can be located. In a display bezel, the camera lens has a limited depth so that a field of view that is sufficient to capture an end user viewing the display often involves a fisheye type of lens that tends to distort the edges of the captured visual image and has difficulty when capturing visual images in low light. To meet quality constraints for captured visual images, a camera should have a larger aperture with Fno of less than 2.0 and distortion of less than 10%.

SUMMARY OF THE INVENTION

Therefore, a need has arisen for a system and method which assembles a lens from plural lens elements to improve low light performance with reduced distortion and a ninety degree field of view.

In accordance with the present invention, a system and method are provided which substantially reduce the disadvantages and problems associated with previous methods and systems for capturing visual images through a lens. The lens has eight elements to capture light in low illumination environments with reduced distortion and a ninety degree field of view.

More specifically, an information handling system processes information with a processor that executes instructions in cooperation with a memory that stores the instructions and information, such as to execute a videoconferencing application that communicates an audiovisual stream through a network. A camera at the information handling system captures a visual image at a field of view for the display viewing position, such as a camera coupled in a peripheral display front. A lens included in the camera has eight lens elements to capture quality visual images with reduced distortion in low light environments. An image side and object side lens element each have a glass material and positive refractive power with spherical surfaces. An inner set of six lens elements have a plastic material and aspherical surface shapes to direct light towards an image sensor with minimal distortion. Lens elements 2, 3 and 7 have negative refractive power. Lens elements 4, 5 and 6 have positive refractive power. The arrangement of lens elements provides an F-number of 1.8 or less for low light visual image capture having distortion of less than 3%.

The present invention provides a number of important technical advantages. One example of an important technical advantage is that a small footprint lens captures high quality visual images in low light environments with an F-number of 1.8 and image sensor of 1/1.8 inches and distortion is kept below 3%.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts a table that provides example specifications for a lens depicted by FIG. 3 having lens elements L1 through L8 and lens surfaces S2 through S18;

FIG. 5 depicts a table that provides example specifications for a lens depicted by FIG. 3 having spherical L1 and L8 elements and aspherical L2 through L7 elements;

FIG. 9 depicts a table of specifications of the example embodiment of the lens.

DETAILED DESCRIPTION

An information handling system camera lens has eight lens elements to improve low light images with a wide field of view and minimal distortion. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
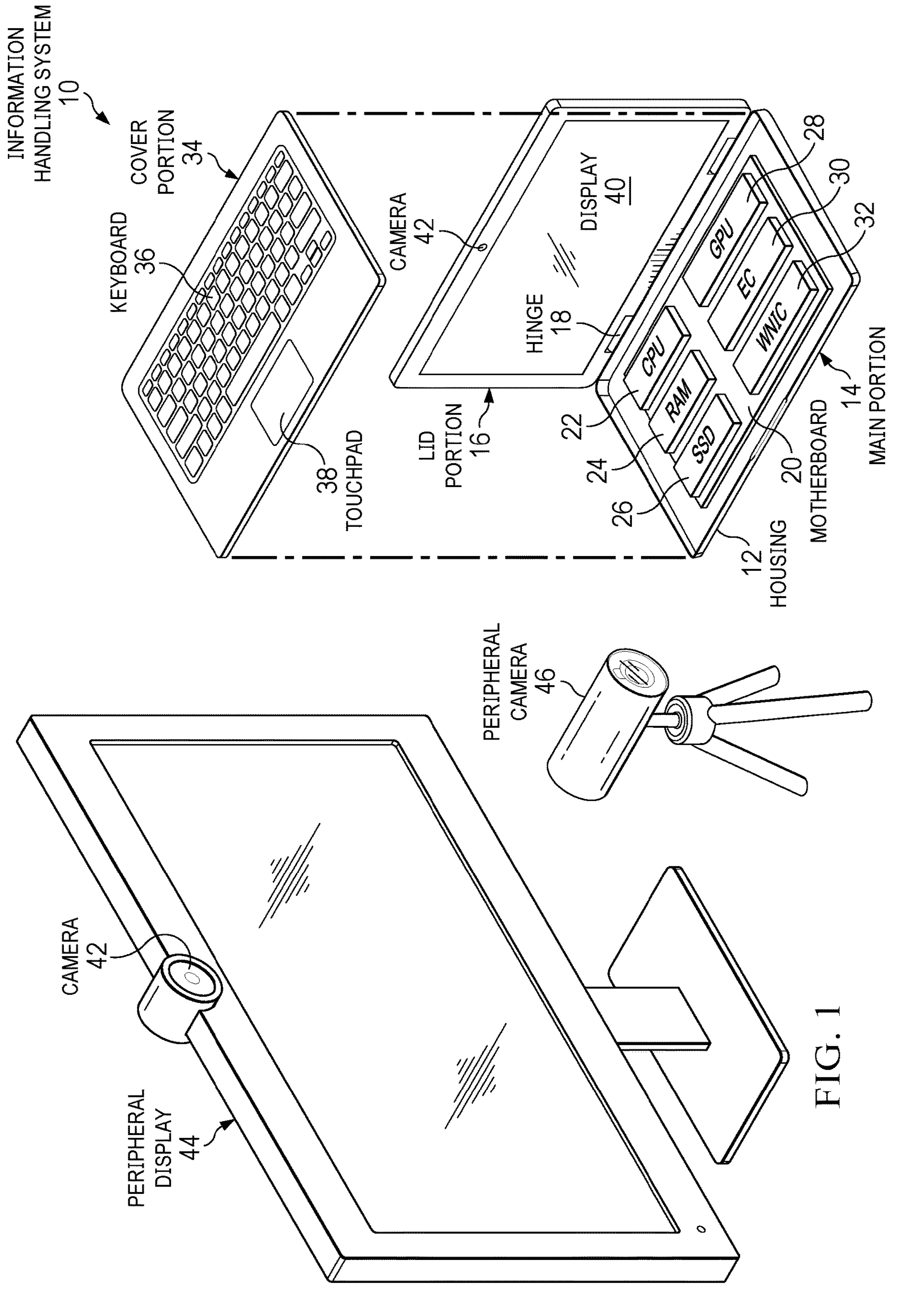
FIG. 1 depicts an information handling system interfaced with plural types of cameras having an improved lens to capture visual images in low light with reduced distortions at a wide field of view.

Referring now to FIG. 1, an information handling system 10 is depicted interfaced with plural types of cameras having an improved lens to capture visual images in low light with reduced distortions at a wide field of view. In the example embodiment, information handling system 10 is built in a portable housing 12 having a main portion 14 rotationally coupled with a lid portion 16 by a hinge 18. A motherboard 20 couples in main portion 14 to interface processing components that cooperate to process information. For example, a central processing unit (CPU) 22 executes instructions to process information in cooperating with a random access memory (RAM) 24 that stores the instructions and information. A solid state drive (SSD) 26 provides persistent storage of the instructions and information, such as an operating system that manages system operations and applications that run over the operating system to perform desired processing tasks, such as a videoconferencing application. A graphics processing unit (GPU) 28 further processes information to generate visual images for presentation at a display. An embedded controller 30 manages system operations at a physical level, such as application of power, thermal constraints and interactions with I/O devices. A wireless network interface controller (WNIC) 32 communicates with external devices, such as through WIFI and BLUETOOTH. A housing cover portion 34 couples over main portion 14 to support a keyboard 36 and touchpad 38 that accept end user inputs.

During operation, information handling system 10 presents visual information as visual images at an integrated display 40 built into housing lid portion 16. Alternatively, visual images are presented at a peripheral display 44, such through a cable or wireless communication interface. When executing a videoconferencing application, visual information of conference participants received through WNIC 32 are presented by GPU 28 at display 40 and/or peripheral display 44 so that an end user viewing the displays looks at the participants. A camera 42 included in housing lid portion 16 captures the end user face when looking at integrated display 40. A camera 42 included in peripheral display 44 captures the end user face when looking at peripheral display 44. A peripheral camera 46 sets up separate from peripheral display 44 to capture visual images from alternative angles, such as on a stand in front of peripheral display 44 or clipped onto a side of peripheral display 44. In an office environment, cameras 42 and 46 should have a small footprint with a wide field of view and a capability to capture images in a low light environment with reduced distortion.

Figure 2:
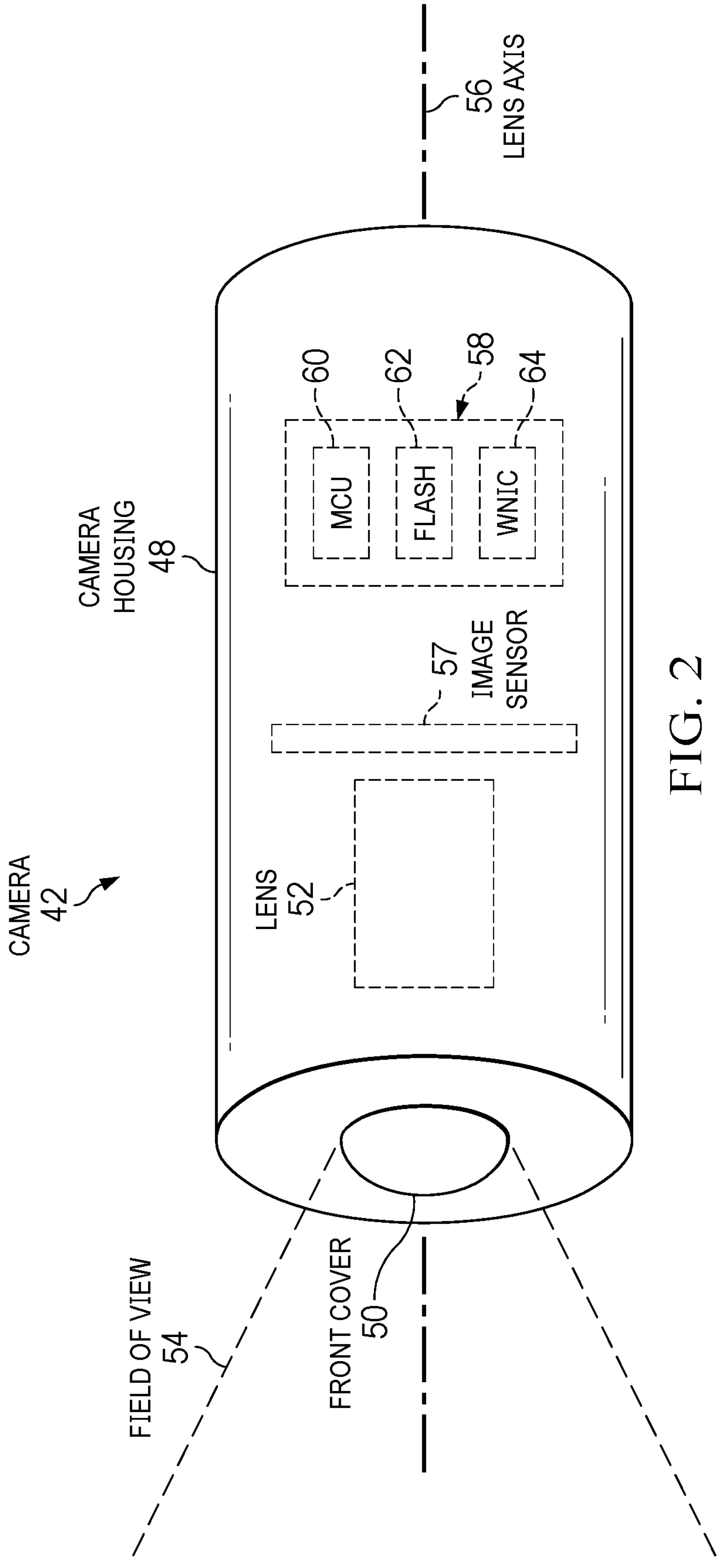
FIG. 2 depicts a side sectional view of an example of a camera having a lens that offers a reduced footprint with a wide field of view and capability to capture images in a low light environment with reduced distortion.

Referring now to FIG. 2, a side sectional view depicts an example of a camera 42 having a lens that offers a reduced footprint with a wide field of view and capability to capture images in a low light environment with reduced distortion. In the example embodiment, camera 42 is built into a camera housing 48 that couples to a peripheral display. Alternative embodiments may use different dimensions to fit into a portable information handling system housing or a peripheral camera. A lens 52 having plural lens elements accepts light along a lens axis through a front cover 50 of an object in a field of view 54. Lens 52 focuses the light as an image at an image sensor 57, which captures the light as digital information. A circuit board 58 interfaces with image sensor 57 so that a processing resource, such as an MCU 60 executing instructions in a flash memory 62, can control capture of visual images for communication through a wireless network interface controller 64.

Figure 3:
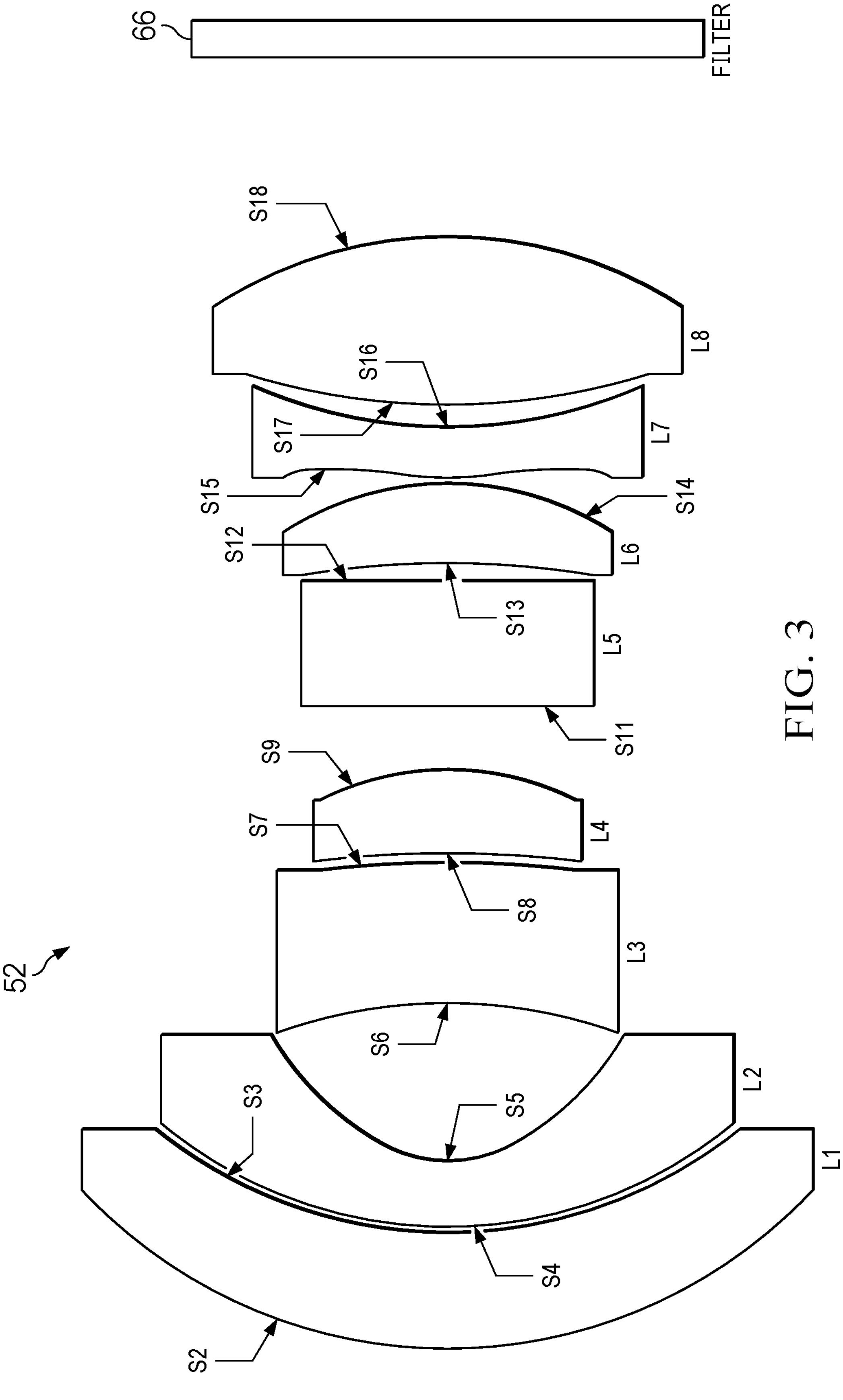
FIG. 3 depicts a side sectional view of the camera lens having a reduced footprint with a wide field of view and capability to capture images in a low light environment with reduced distortion.

Referring now to FIG. 3, a side sectional view depicts the camera lens 52 having a reduced footprint with a wide field of view and capability to capture images in a low light environment with reduced distortion. Lens 52 has eight lens elements L1 through L8 that cooperate to direct light from an object side at lens element L1 through a filter 66 at an image side of lens element L8. Each of lens elements L1 through L8 has an object-side surface and an image side surface labeled S2 through S18. The object side lens L1 and the image side lens L8 each have a positive refractive power and are formed from glass material. Lens L1 has a refractive index of 1.81 and focal length of 390.319. Lens L8 has a refractive index of 1.59 and focal length of 7.742. The inner six lens elements L2 through L7 are formed from plastic. L2, L3 and L7 each have a negative refractive power. L2 has a refractive index of 1.54 and a focal length of −7.85. L3 has a refractive index of 1.68 and a focal length of −132.883. L7 has a refractive index of 1.67 and a focal length of −8.484. L4, L5 and L6 each have a positive refractive power. L4 has a refractive index of 1.54 and a focal length of 11.623. L5 has a refractive index of 1.68 and a focal length of 82.678. L6 has a refractive index of 1.55 and a focal length of 7.482. L1 has $86<f1/f<87$ fit to support the field of view to ninety degrees. f1 refers to the L1 focus length, and F refers to the focus length of lens 52. The arrangement of lens elements targets an F-number of 1.8 or less to earn low light performance and improved optical bokeh (background blur) with minimal distortion and a small field curvature. In the example embodiment, with an F-number of 1.8, good image quality is provide at a 1/1.8" sensor at a distortion of less than 3%.

Referring now to FIG. 4, a table provides example specifications for a lens depicted by FIG. 3 having lens elements L1 through L8 and lens surfaces S2 through S18. The table provides example dimensions for surface radius, thickness and separation, material, refractive index, Abbe number and focal length. In the example embodiment, the filter has a thickness of 0.3 mm. Lens 52 has an effective focal length of 4.54 mm, a relative illumination of 39%, a front to back focal length with the filter and cover glass of 4.81 mm, a total track length of 26.6 mm, and a chief ray angle of 9.9 degrees. The horizonal field of view is 82 degrees; the vertical field of view is 51.3 degrees and the diagonal field of view is 90 degrees. In alternative embodiments, adjustments to the size and spacing of the lens element provide the lens to fit into various camera footprints.

Referring now to FIG. 5, a table provides example specifications for a lens depicted by FIG. 3 having spherical L1 and L8 elements and aspherical L2 through L7 elements. The depicted aspherical coefficients for surfaces S4 through S16 target a lens performance of a 1/1.8" sensor and 125 lp/mm at a 50% modulation transfer function. The depicted aspherical coefficients keep good performance for all fields of view to minimize distortion.

Figure 6:
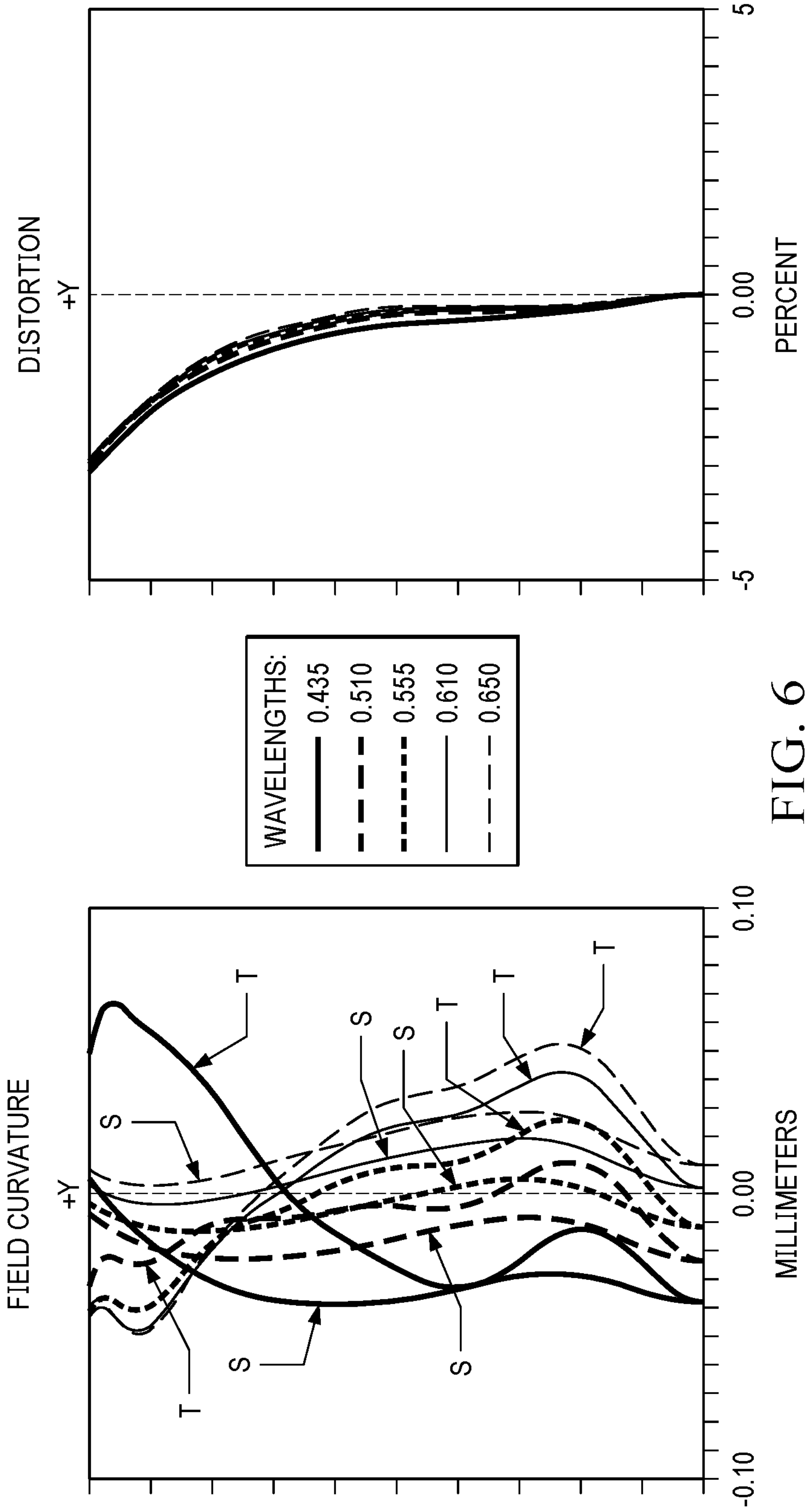
FIG. 6 depicts a graph of an example of field curvature and distortion for the example embodiment of lens shown in FIGS. 3-5.

Referring now to FIG. 6, a graph depicts an example of field curvature and distortion for the example embodiment of lens shown in FIGS. 3-5. The arrangement of lens elements produces less than 3% distortion, which is essentially imperceptible by the human eye.

Figure 7:
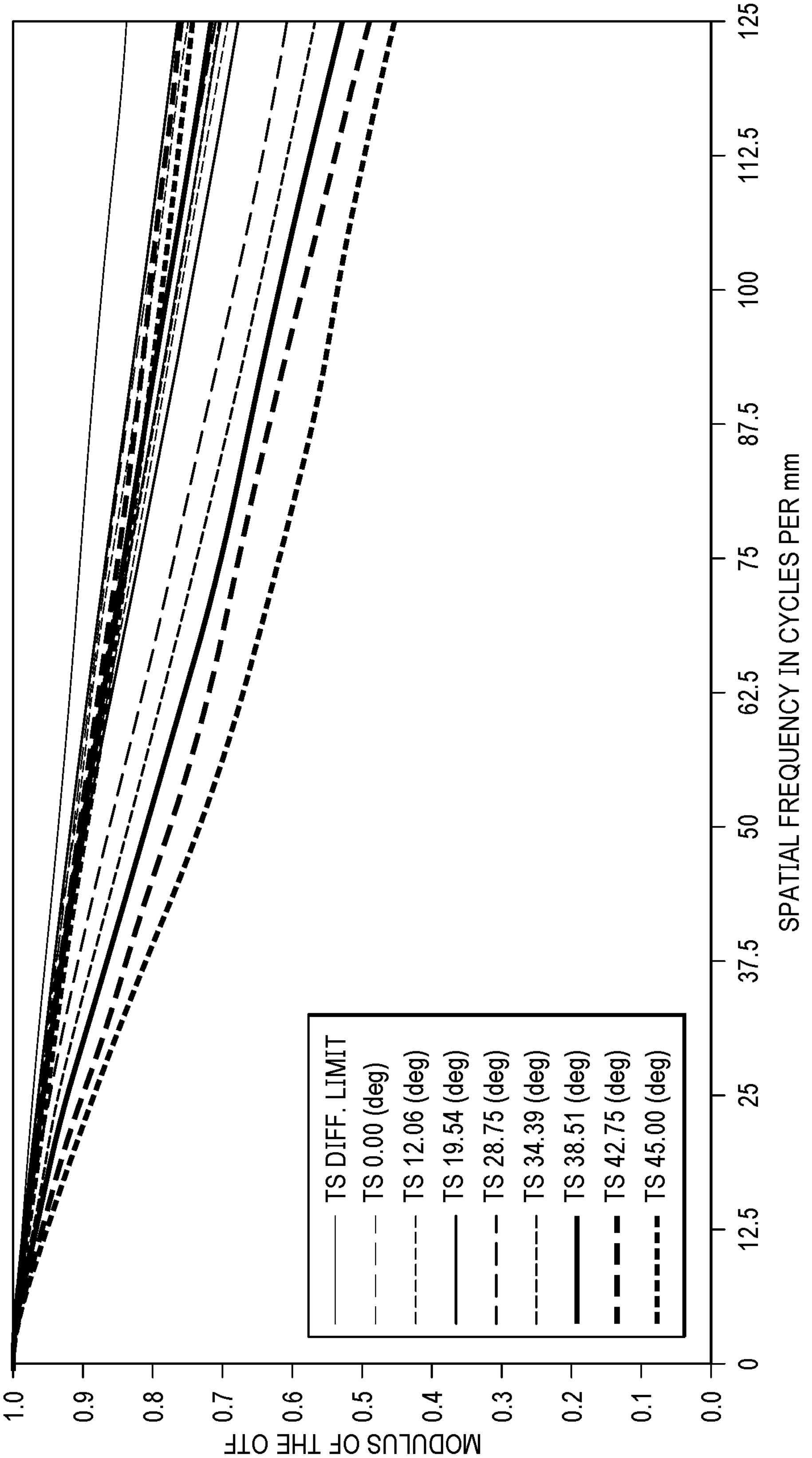
FIG. 7 depicts a graph of an example of polychromatic diffraction MTF for the lens modulus versus spatial frequency in cycles per mm.

Referring now to FIG. 7, a graph depicts an example of polychromatic diffraction MTF for the lens modulus versus spatial frequency in cycles per mm.

Figure 8:
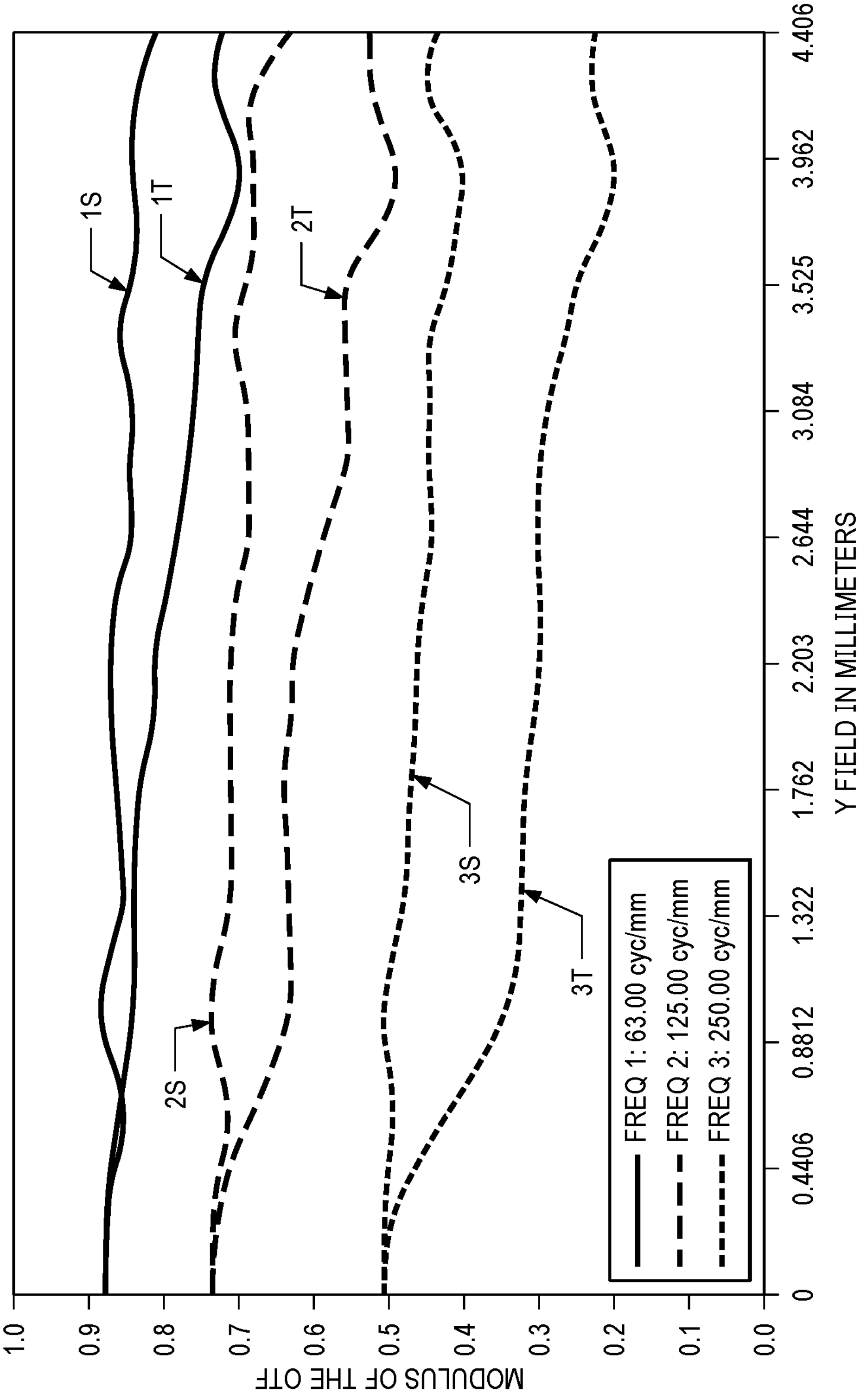
FIG. 8 depicts a graph of an example of an optical transfer function for the lens modulus versus field in mm.

Referring now to FIG. 8, a graph depicts an example of an optical transfer function for the lens modulus versus field in mm.

Referring now to FIG. 9, a table depicts specifications for an example embodiment of the camera lens. The lens has an effective focal length of 4.54 mm and F-number of 1.8. Optical distortion is less than 3% and relative illumination is 39%. The focal back length is 4.23 mm and the total track length is 26.65 mm. The chief ray angle is 9.9 degrees. The horizontal field of view is 80.6 degrees, the vertical field of view is 50.1 degrees, giving a diagonal field of view of 90 degrees. In alternative embodiments, adjustments to the specifications may be made to achieve particular goals.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor coupled in the housing and operable to process information;

a memory coupled in the housing and interfaced with the processor, the memory operable to store the information;

a display interfaced with the processor and operable to present the information as visual images; and a camera having a field of view positioned to capture a visual image of an end user viewing the display, the camera having a lens with eight lens elements ordered from an object side to an image side:

a first lens element having positive refractive power;

a second lens element having negative refractive power;

a third lens element having negative refractive power;

a fourth lens element having positive refractive power;

a fifth lens element having a positive refractive power;

a sixth lens element having a positive refractive power;

a seventh lens element having a negative refractive power; and an eighth lens element having a positive refractive power;

wherein:

the first lens element and the eighth lens element are glass; and the second lens element through the seventh lens element are plastic.

2. The information handling system of claim 1 wherein the total track length of the lens is 26.6 mm.

3. The information handling system of claim 1 wherein the F-number of the lens is 1.8 or less.

4. The information handling system of claim 3 wherein the effective focal length of the lens is 4.54 mm or less.

5. The information handling system of claim 4 having optical distortion of less than 3%.

6. The information handling system of claim 1 wherein the first lens element has a fit of $86<f1/f<87$.

7. The information handling system of claim 1 wherein plural of the lens elements have aspherical coefficient surfaces to achieve a 50% modulation transfer function.

8. The information handling system of claim 7 wherein the lens has at least a 90 degree diagonal field of view.

9. The information handling system of claim 1 wherein lens elements two through seven are aspheric.

10. A camera lens comprising:

a first lens element having positive refractive power;

a second lens element having negative refractive power;

a third lens element having negative refractive power;

a fourth lens element having positive refractive power;

a fifth lens element having a positive refractive power;

a sixth lens element having a positive refractive power;

a seventh lens element having a negative refractive power; and an eighth lens element having a positive refractive power;

wherein the F-number of the lens is 1.8 or less.

11. The camera lens of claim 10 wherein:

the first lens element and the eighth lens element are glass; and the second lens element through the seventh lens element are plastic.

12. The camera lens of claim 10 wherein the total track length of the lens is 26.6 mm.

13. The camera lens of claim 10 wherein the effective focal length of the lens is 4.54 mm or less.

14. The camera lens of claim 13 having optical distortion of less than 3%.

15. The camera lens of claim 10 wherein the first lens element has a fit of $86<f1/f<87$.

16. The camera lens of claim 10 wherein plural of the lens elements have aspherical coefficient surfaces to achieve a 50% modulation transfer function.

17. The camera lens of claim 16 wherein the lens has at least a 90 degree diagonal field of view.

18. The camera lens of claim 10 wherein lens elements two through seven are aspheric.

19. A camera lens comprising:

a first lens element having positive refractive power;

a second lens element having negative refractive power;

a third lens element having negative refractive power;

a fourth lens element having positive refractive power;

a fifth lens element having a positive refractive power;

a sixth lens element having a positive refractive power;

a seventh lens element having a negative refractive power; and an eighth lens element having a positive refractive power;

wherein lens elements two through seven are aspheric.

* * * * *